US011238087B2

(12) United States Patent
Ma et al.

(10) Patent No.: US 11,238,087 B2
(45) Date of Patent: Feb. 1, 2022

(54) SOCIAL ANALYTICS BASED ON VIRAL MENTIONS AND THREADING

(71) Applicant: Microsoft Technology Licensing, LLC, Redmond, WA (US)

(72) Inventors: Weiqin Ma, San Jose, CA (US); Weidong Zhang, San Jose, CA (US); Yongzheng Zhang, San Jose, CA (US); Chi-Yi Kuan, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 348 days.

(21) Appl. No.: 15/850,880

(22) Filed: Dec. 21, 2017

(65) Prior Publication Data

US 2019/0197125 A1 Jun. 27, 2019

(51) Int. Cl.
*G06F 16/43* (2019.01)
*G06F 9/451* (2018.01)
*G06F 16/438* (2019.01)
*G06Q 50/00* (2012.01)

(52) U.S. Cl.
CPC .............. *G06F 16/43* (2019.01); *G06F 9/451* (2018.02); *G06F 16/438* (2019.01); *G06Q 50/01* (2013.01)

(58) Field of Classification Search
CPC ........ G06F 16/43; G06F 16/438; G06F 9/451; G06F 16/9536; G06Q 50/01; G06Q 30/0255; H04L 51/32
See application file for complete search history.

(56) References Cited

U.S. PATENT DOCUMENTS

| 9,245,252 | B2* | 1/2016 | Newton | G06Q 30/0201 |
|---|---|---|---|---|
| 9,412,136 | B2* | 8/2016 | Gertzfield | G06Q 50/01 |
| 2006/0042483 | A1* | 3/2006 | Work | G06F 16/24578 |
| | | | | 101/91 |
| 2009/0240516 | A1* | 9/2009 | Palestrant | G06Q 50/01 |
| | | | | 705/346 |
| 2012/0042022 | A1* | 2/2012 | Sheth | H04L 51/32 |
| | | | | 709/206 |

(Continued)

OTHER PUBLICATIONS

Topic Cube: Topic Modeling for OLAP on Multidimensional Text DatabasesDuo Zhang, Chengxiang Zhai, and Jiawei HanProceedings of the 2009 SIAM International Conference on Data Mining. 2009, 1124-1135 (Year: 2009).*

*Primary Examiner* — Cheyne D Ly
(74) *Attorney, Agent, or Firm* — Schwegman Lundberg & Woessner, P.A.

(57) ABSTRACT

A machine may be configured to generate an enhanced user interface for displaying social analytics based on viral mentions and threading. For example, the machine accesses a plurality of items of digital content. The machine extracts, for each of the plurality of items of digital content, a title that describes a particular item of digital content. The machine generates a group of items of digital content based on the extracted titles associated with the plurality of items of digital content. The machine identifies, from the group of items of digital content, an original item of digital content and one or more subsequent items of digital content. The machine determines a strength value associated with the original item of digital content. The machine generates and causes a display of an enhanced user interface that displays the title and the strength value associated with the original item of digital content.

19 Claims, 12 Drawing Sheets

(56) References Cited

U.S. PATENT DOCUMENTS

| | | | |
|---|---|---|---|
| 2012/0246104 A1* | 9/2012 | Di Sciullo | G06Q 50/01 706/46 |
| 2015/0169587 A1* | 6/2015 | Silverman | G06Q 30/0201 707/751 |
| 2015/0172145 A1* | 6/2015 | Skiba | H04W 4/21 709/224 |
| 2016/0066003 A1* | 3/2016 | Foote | H04N 21/4661 725/35 |
| 2016/0188729 A1* | 6/2016 | Ardhanari | G06F 3/04817 707/727 |
| 2018/0039702 A1* | 2/2018 | Bailey | G06F 16/9535 |
| 2018/0189668 A1* | 7/2018 | Ray | G06Q 50/01 |
| 2018/0293306 A1* | 10/2018 | Park | G06F 16/345 |
| 2019/0012387 A1* | 1/2019 | Li | G06F 16/9536 |

\* cited by examiner

SOCIAL ANALYTICS BASED ON VIRAL MENTIONS AND THREADING

TECHNICAL FIELD

The present application relates generally to systems, methods, and computer program products for generating an enhanced user interface for displaying social analytics based on viral mentions and threading to conserve storage space and improve efficiency in processing large amounts of data.

BACKGROUND

Companies that provide content or services online may sometimes analyze how popular the provided online content is with online users. Generally, the popularity of the online content is measured based on user engagement with the online content. The user engagement may include indicators that the online users like the online content, share the online content with other users, write online comments associated with the online content, etc. Commonly, the more likes, shares, or comments are associated with an online content item, the more popular the online content item is considered to be.

BRIEF DESCRIPTION OF THE DRAWINGS

Some embodiments are illustrated by way of example and not limitation in the figures of the accompanying drawings, in which.

DETAILED DESCRIPTION

Figure 1A:
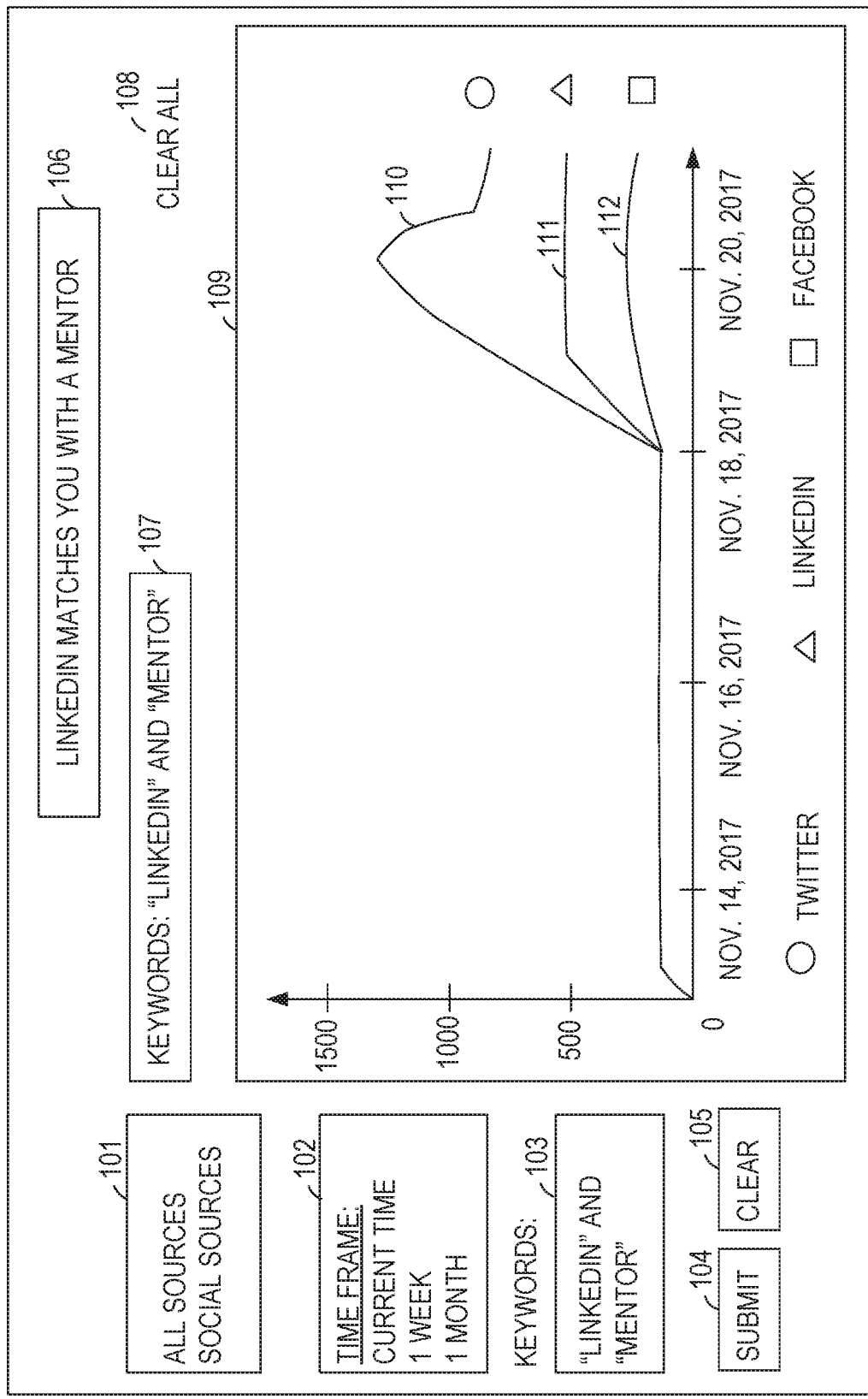
FIG. 1A is a diagram illustrating an enhanced user interface for displaying social analytics based on viral mentions and threading, according to some example embodiments.

Example methods and systems for generating an enhanced user interface for displaying social analytics based on viral mentions and threading, are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Companies that provide content or services online may sometimes analyze how popular the provided online content is with online users. Generally, the popularity of the online content is measured based on user engagement with the online content. The user engagement may include indicators that the online users like the online content, share the online content with other users, write online comments associated with the online content, etc. Commonly, the more likes, shares, or comments are associated with an online content item, the more popular the online content item is considered to be.

Often, with certain sources of social media, such as Twitter, there are numerous similar items of content (e.g., messages, tweets, etc.) regarding a particular topic. An author may generate an original message, and other users may generate a social media signal pertaining to (e.g., a re-tweet of) the original message or of a slightly modified original message. In some instances, the original message is modified by an emoticon, remarks, additional content, etc. A computer system that manages or utilizes such original messages and viral signals related to the original message may require great amounts of storage space, and with time may become inefficient in processing the great amounts of data related to various digital content items. Additionally, in the example above, a user viewing the original tweet and the numerous re-tweets of the original message does not have the best user experience because the user may have to look at large numbers of very similar content, which may be very time consuming.

It may be beneficial to have an enhanced computer system (e.g., a viral analytics system) that identifies various digital content items (e.g., tweets, comments, articles, feedback, etc.) that discuss or pertain to the same topic, categorize them in a category represented by a unique topic, identifies topics of interest to a community (e.g., a group, a population, a company, etc.), and take various further actions based on the identified topics of interest to the community.

In some example embodiments, a viral analytics system (hereinafter also "system") ingests and integrates unstructured data from multiple social media channels (e.g., Facebook, Twitter, LinkedIn, blogs, news articles, etc.), analyzes the data to identify similar digital content items, and identifies levels of virality associated with various digital content items. Virality is the tendency of an image, video, or piece of information to be circulated rapidly and widely from one Internet user to another. The viral analytics system may, in some example embodiments, identify similar content using natural language processing techniques. In some example embodiments, natural language processing techniques such as vector space model, and cosine similarity or edit distance can be used to measure the similarity of two pieces of text where each piece of text is represented by the vector space model and the similarity can be measured by cosine similarity (Euclidean distance) or edit distance. If the similarity is over a preset threshold value, these two pieces of text are deemed to be sharing the same topic. Another approach is to identify the topics of each piece of text using topic modeling techniques such as Term Frequency-Inverse Document Frequency (TF-IDF) or Latent Dirichlet Allocation (LDA) and then measure the overlapping between topics for two pieces of text.

In some instances, viral analytics system groups (e.g., consolidates, categorizes, etc.) items of digital content, identifies the original item of digital content in the group of items of digital content, and generates a viral strength value associated with the original content item. The viral strength value (hereinafter also "strength value") may represent a viral mention number (e.g., the number of threads that started after the original message was posted, and are talking about the same topic, the number of times the item of digital content was mentioned in the same or other sources of content).

In certain example embodiments, the items of digital content in a group come from the same source of data (e.g., Twitter). In some example embodiments, the items of digital content in a group come from various sources of data (e.g., a plurality of social media channels, a combination of various social media channels and internal data of a company, etc.).

In some example embodiments, the viral analytics system, based on the strength values associated with various original items of content, generates an enhanced user interface for displaying social analytics based on viral mentions and threading. In some instances, the improved user interface takes the form of a dashboard that provides functionality for visualizing virality trends associated with certain items of digital content, for customizing reports describing the virality of certain virality trends, for customizing search queries to surface popular topics, etc. In some instances, a third-party computer system is improved based on accessing various above-mentioned data at the viral analytics system via an API, and implementing a third-party application that utilized the various above-mentioned data.

In some example embodiments, the viral analytics system is improved based on implementing functionality for predicting that some digital content items will become viral. For instance, the viral analytics system may aggregate an original digital content item and various viral messages or signals (e.g., re-tweets, other items of digital content sharing the same topic as the original message, etc.) related to the original digital content item based on certain period of time, and may generate a histogram to show the increasing number of viral messages or signals (e.g., the development of the virality of the original message) related to a topic. If a particular increase (e.g., a large increase) in the viral messages or signals is identified over a certain period of time, a topic may be predicted to become viral. In some instances, if the viral analytics system considers the number of the viral messages over a smaller period of time (e.g., an hour, a day, etc.), compares the number of the viral messages over a greater period of time (e.g., a day, a week, etc.), and detects that the change is becoming more intense (e.g., there are more mentions associated with a topic), then that is a very strong signal that an item of content is going to trend up in the next day or the next several days.

In some example embodiments, the viral analytics system accesses, from a database record that stores digital content, a plurality of items of digital content. The viral analytics system extracts, for each particular item of digital content in the plurality of the items of digital content, a title that describes the particular item of digital content. The extracting of the title is based on analysis of one or more phrases included in the particular item of digital content. The viral analytics system generates a group of items of digital content based on the extracted titles associated with the plurality of items of digital content. The result of generating the group of items based on the extracted titles associated with the plurality of items of digital content is a group of similar items that share the same title.

Each item in the group of items of digital content is associated with a timestamp that indicates (e.g., represents, describes, etc.) the time the item of digital content was posted online. The viral analytics system identifies, from the group of items of digital content, an original item of digital content and one or more subsequent items of digital content based on the timestamps associated with the items of digital content included in the group.

The viral analytics system determines a strength value associated with the original item of digital content. In certain instances, the determining of the strength value associated with the original item of digital content is based on the number of the one or more subsequent items of digital content included in the group.

The viral analytics system generates and causes the display of an enhanced user interface on a client device. The generating of the user interface includes causing a display of the title and the strength value associated with the original item of digital content in the user interface of the client device.

FIG. 1A is a diagram illustrating an enhanced user interface for displaying social analytics based on viral mentions and threading, according to some example embodiments. The viral analytics system generates and causes the display of an enhanced user interface (hereinafter, also "user interface," "UI," "dashboard," etc.) 100 on a client device. As shown in FIG. 1A, the user interface 100 includes one or more UI elements for receiving selections (e.g., by a user of the user interface 100) with respect to various attributes that characterize (e.g., are associated with) the data (e.g., a plurality of items of digital content, hereinafter also "viral content data") utilized by the viral analytics system to analyze the virality of digital content. The viral analytics system accesses the plurality of items of digital content from a record of a database that stores digital content. Example of the various attributes associated with the items of digital content are an identifier of the author of the digital content item, a source that published the digital content item, a time of publication of the digital content item at the source, a geographic region associated with the author or the source, a language of publication of the digital content item, etc.

As shown in FIG. 1A, the UI element 101 specifies one or more options of sources of digital content items (e.g., "all sources," such as internal data and online data, or "social sources," such as Facebook, Twitter, LinkedIn, etc.). In some example embodiments, a user of the user interface 100, by selecting a source option provided by the UI element 101, requests that the viral analytics system only analyze digital content items accessed from the particular selected source.

The UI element 102 specifies one or more times (or time frames) for which the viral analytics system can analyze viral content data. Examples of the one or more times (or time frames) are the current time, one day, one week, one month, three months, one year, etc. In some example embodiments, a user of the user interface 100, by selecting a source option provided by the UI element 102, requests that the viral analytics system only analyze digital content items posted during the particular selected time or time frame.

The UI element 103 is an input field that allows a user of the user interface 100 to specify one or more keywords to be used by the viral analytics system to identify viral content data that matches the specified one or more keywords. For example, a user of the user interface 100 enters the keywords "LinkedIn" and "mentor" in the input field, and selects UI element 104 to submit the keywords to a back-end module of the viral analytics system, and to indicate that the user requests that the viral analytics system perform an analysis of the viral content data that includes these keywords. In some example embodiments, typeahead features may be used in association with the UI element 103 to facilitate the input of keywords by the user.

The UI element 105 allows the user to clear all the previously selected options or provided keywords. The UI element 108 allows the user to request a clearing of the analytics displayed in the user interface 100.

In the above example, the viral analytics system access a record of a database that stores digital content items, identifies digital content items that include the specified keywords "LinkedIn" and "mentor," and extracts, for each particular item of digital content in the plurality of the items of digital content, a title that describes the particular item of digital content. As shown in FIG. 1A, the title element 106 displays the title "LinkedIn matches you with a mentor." This title includes the keywords specified by the user in the UI element 103. The extracting of the title is based on analysis of one or more phrases included in the particular item of digital content, and matching the user-provided keywords with the one or more phrases included in the particular item of digital content.

Then, the viral analytics system generates a group of items of digital content based on the extracted titles associated with the plurality of items of digital content. Each item in the group of items of digital content is associated with a timestamp that indicates the time the item of digital content was posted online, and with an indicator of the source that published the particular item of digital content. The viral analytics system may generate and present in the user interface 100 various analytics pertaining to the group of items of digital content associated with a particular title. As shown in FIG. 1A, area 109 of the user interface 100 displays a graph report that describes the virality of the digital content items with the title "LinkedIn matches you with a mentor." FIG. 1A illustrates that, on Nov. 18, 2017, an original item of digital content that includes the keywords "LinkedIn" and "mentor" began trending on social media channels. FIG. 1A also illustrates the virality trends (e.g., how the popularity of the original message or topic developed or waned) for the original item and/or topic based on various social media sources, such as Twitter, LinkedIn, and Facebook. FIG. 1A also indicates the number of subsequent digital content items (e.g., re-tweets, etc.) included in the group of digital content items, as segmented by social media source. The aggregate number of subsequent digital content items included in the group of digital content items may serve as basis for determining, by the viral analytics system, a strength value associated with the original item of digital content. The strength value is another type of analytics that may be presented in the user interface 100 in association with the title 106 (or with the original item of digital content) to indicate the popularity of a certain topic with a community or a population.

Figure 1B:
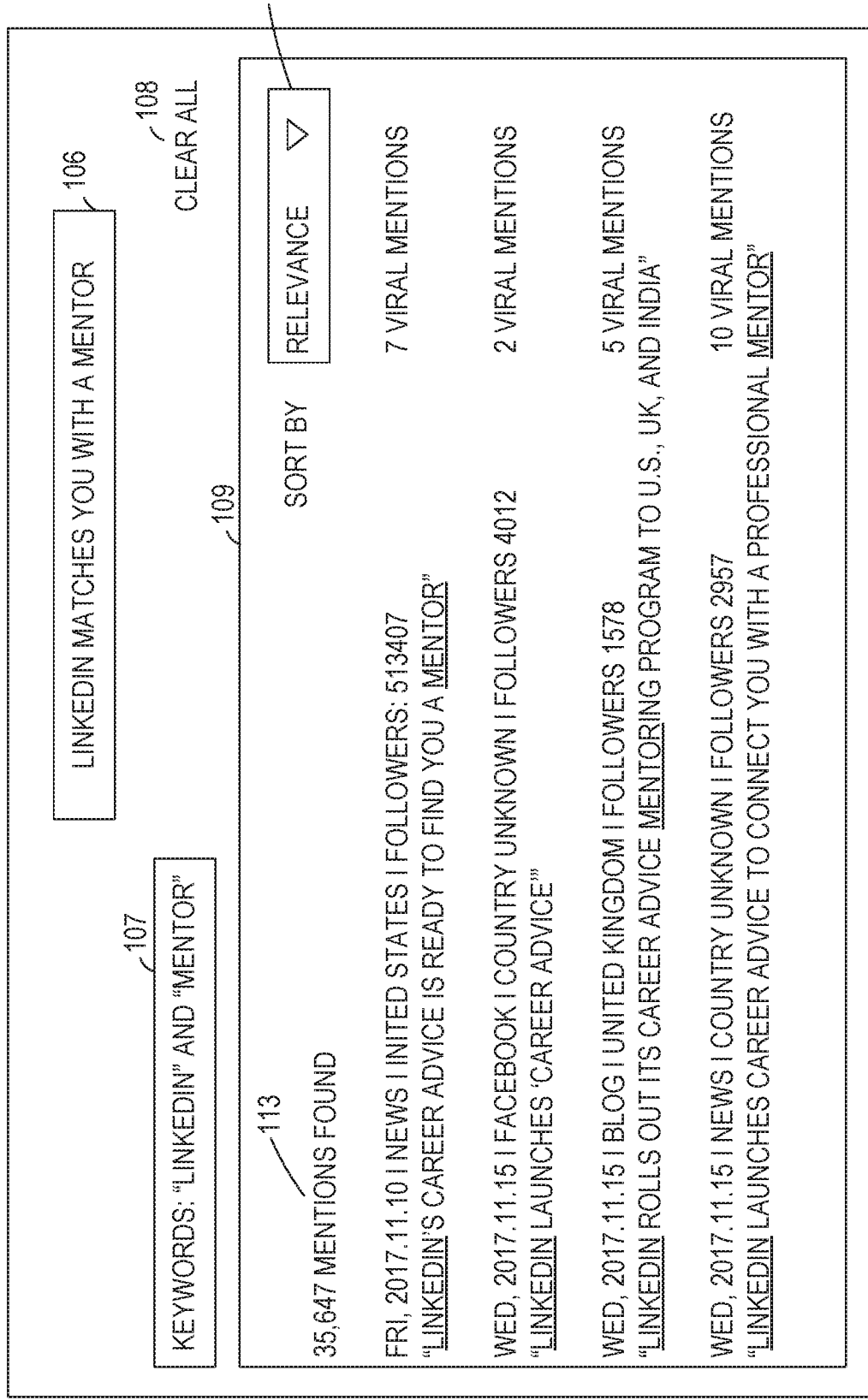
FIG. 1B is a diagram illustrating an enhanced user interface for displaying social analytics based on viral mentions and threading, according to some example embodiments.

FIG. 1B is a diagram illustrating an enhanced user interface for displaying social analytics based on viral mentions and threading, according to some example embodiments. As shown in FIG. 1B, the user interface 100 displays, in UI area 109, a list of identifiers of (e.g., titles associated with) original content items that include the keywords 107 "LinkedIn" and "mentor." Each identifier of an original content item is displayed in association with a strength value pertaining to that original content item. As illustrated in FIG. 1B, the strength value may be represented by the number of viral mentions (e.g., re-tweets, etc.) of the original content item.

In some example embodiments, each identifier of an original content item is displayed in association with enriched source data that pertains to the author or the source of the item of digital content. In the context of the author or the source being a member of a social networking service, such as LinkedIn, the enriched source data may include various information pertaining to profile data associated with the author or the source, member activity and behavior data associated with the author or the source, or social graph data associated with the author or the source. The enriched source data, in some instances, includes sentiment analysis data pertaining to the content.

Also shown in area 109 of the user interface 100 is the number of mentions found 113 (e.g., items of digital content) that are associated with the title 106 (e.g., "LinkedIn matches you with a mentor"). The drop-down UI element 114 allows a user to request the viral analytics system to sort the list of identifiers of original content items based on various factors, such as a relevance of the original content items to the title 106 or the keywords 107, the strength values (e.g., the viral mentions numbers) of the original content items, a source identifier, a date of publication of the original content item, a type of source (e.g., social media channels, news media, blog, data internal to a company, etc.), a particular source, a geographic area, a number of followers, a sentiment associated with the content, or other enriched source data associated with the author or the source.

The viral analytics system is further enhanced by functionality for receiving a selection of (e.g., a click on) a particular strength value (e.g., "7 viral mentions") associated with a particular original item of content (e.g., "LinkedIn's career advice is ready to find you a mentor"), identifying the subsequent items of content included in a thread associated with the particular original item, and causing a display of a list of seven identifiers of the seven subsequent items of digital content (e.g., "7 viral mentions"). In some instances, an identifier of a subsequent item of digital content is a compressed mention, a sentence, or a phrase that can be expanded, at the request of a user (e.g., by clicking a "see more" UI element of user interface 100), to display a larger part or the entirety of the subsequent item of digital content.

In various instances, the viral analytics system is further enhanced by functionality for selecting only one (e.g., the first in time) of a number of duplicate items of digital content associated with a particular subsequent author (e.g., an author of a viral mention) and with the particular topic or title before including the one of a number of duplicate items of digital content in list of viral mentions to be displayed in the user interface 100.

In some instances, the viral analytics system is further enhanced by functionality for determining the sentiment of each digital content item in a group, for classifying the digital content item based on their associated sentiments (e.g., as positive, neutral, or negative), and for causing a display of a representation (e.g., visual, graphical, or textual representation.) of the sentiment associated with a respective digital content item in the user interface, in association with a reference to (e.g., an identifier of) the respective digital content item.

Figure 1C:
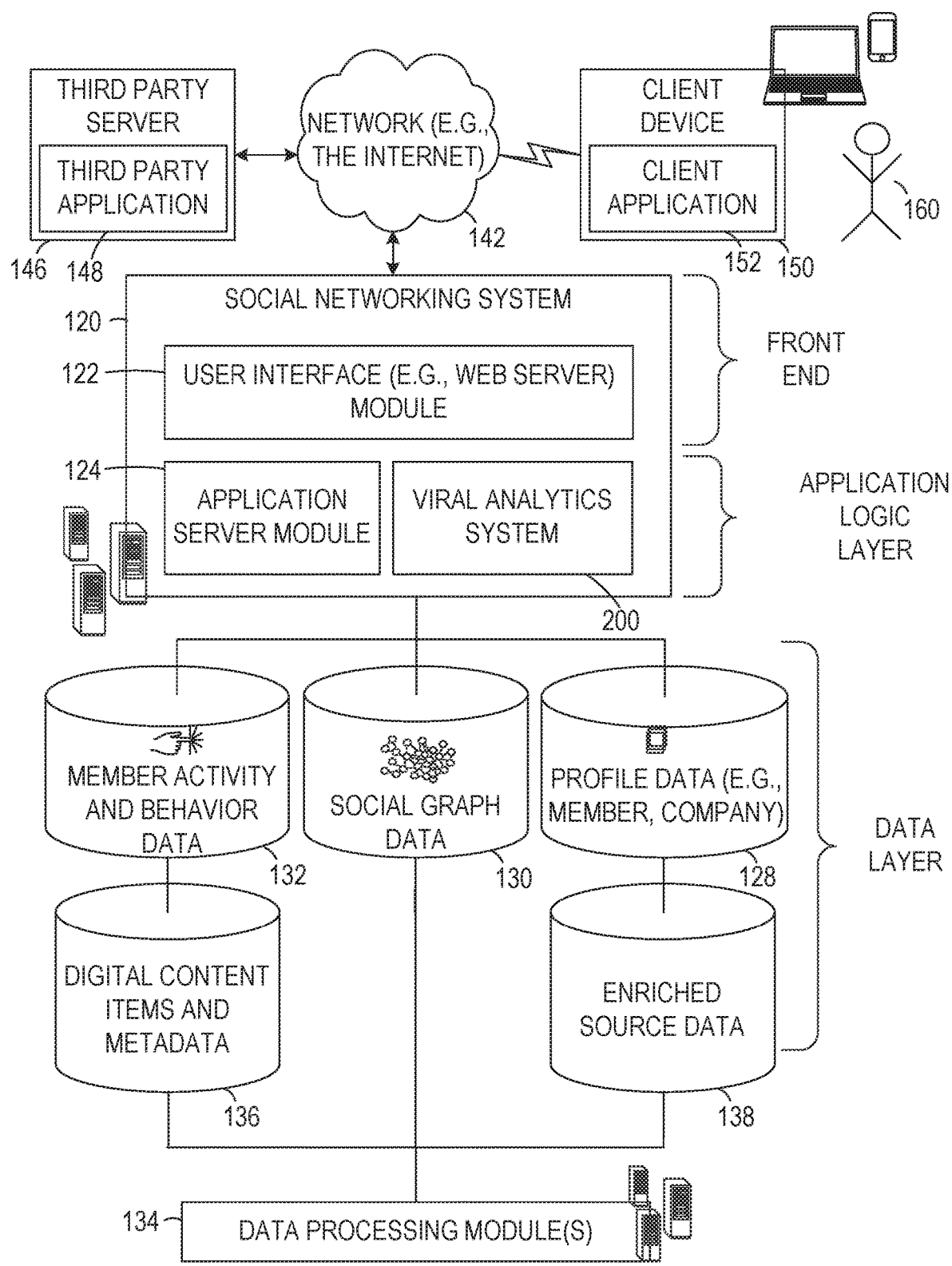
FIG. 1C is a network diagram illustrating a client-server system, according to some example embodiments.

An example method and system for generating an enhanced user interface for displaying social analytics based on viral mentions and threading may be implemented in the context of the client-server system illustrated in FIG. 1C. As illustrated in FIG. 1C, the viral analytics system 200 is part of the social networking system 120. As shown in FIG. 1C, the social networking system 120 is generally based on a three-tiered architecture, consisting of a front-end layer, application logic layer, and data layer. As is understood by skilled artisans in the relevant computer and Internet-related arts, each module or engine shown in FIG. 1C represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1C. However, a skilled artisan will readily recognize that various additional functional modules and engines may be used with a social networking system, such as that illustrated in FIG. 1C, to facilitate additional functionality that is not specifically described herein. Furthermore, the various functional modules and engines depicted in FIG. 1C may reside on a single server computer, or may be distributed across several server computers in various arrangements. Moreover, although depicted in FIG. 1C as a three-tiered architecture, the inventive subject matter is by no means limited to such architecture.

As shown in FIG. 1C, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 142 to exchange information with the social networking system 120. Each of the client devices 150 may comprise a computing device that includes at least a display and communication capabilities with the network 142 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1C, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132. An example of such activity and behavior data is the identifier of an online ad consumption event associated with the member (e.g., an online ad viewed by the member), the date and time when the online ad event took place, an identifier of the creative associated with the online ad consumption event, a campaign identifier of an ad campaign associated with the identifier of the creative, etc.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the SNS may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some example embodiments, members may receive digital communications (e.g., advertising, news, status updates, etc.) targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For example, an ad serving engine showing ads to users may be implemented with one or more application server modules 124. According to another example, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server modules 124. As illustrated in FIG. 1C, social networking system 120 may include the viral analytics system 200, which is described in more detail below.

Further, as shown in FIG. 1C, a data processing module 134 may be used with a variety of applications, services, and features of the social networking system 120. The data processing module 134 may periodically access one or more of the databases 128, 130, 132, 136, or 138, process (e.g., execute batch process jobs to analyze or mine) profile data, social graph data, member activity and behavior data, digital content items and metadata, or enriched source data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers, such as Hadoop servers for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
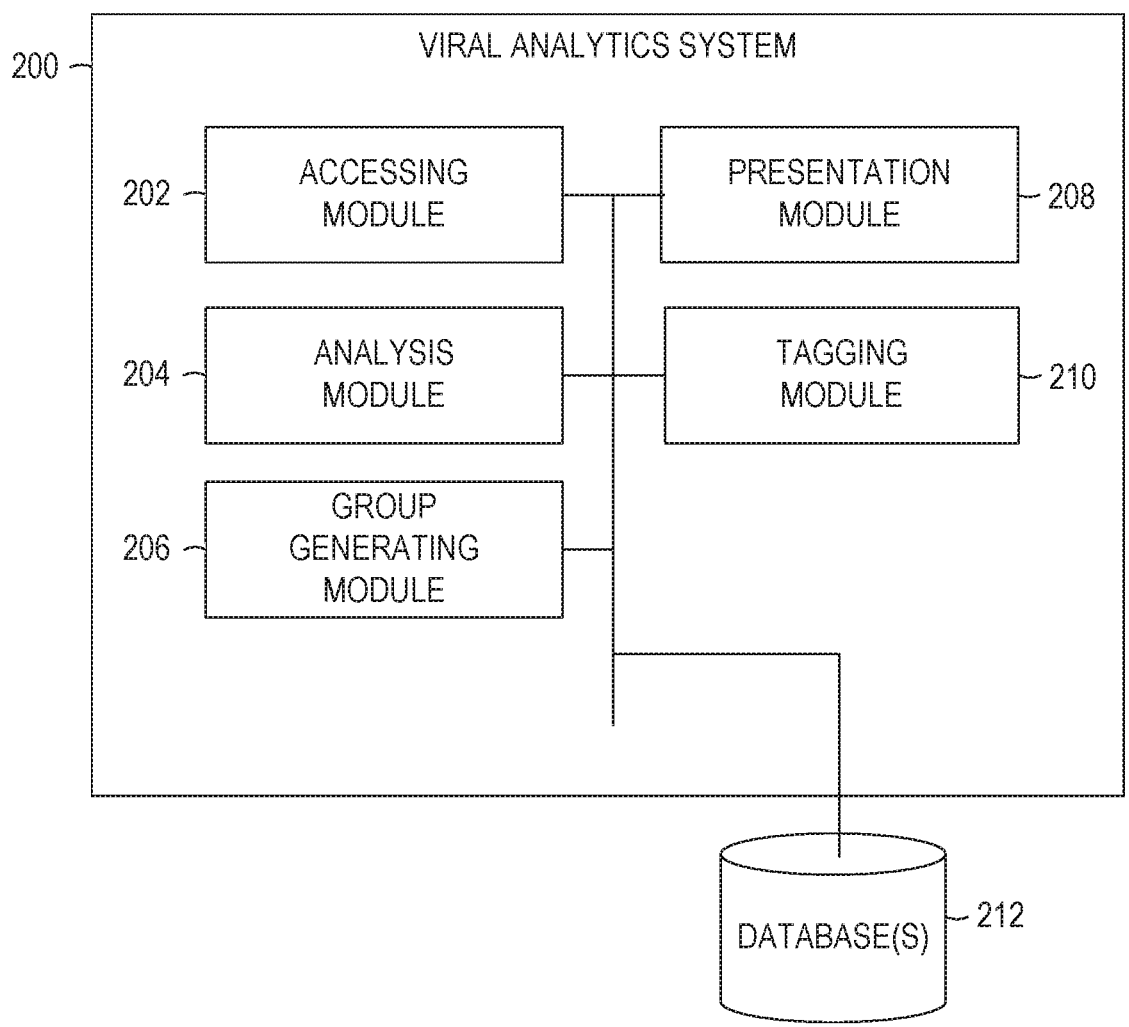
FIG. 2 is a block diagram illustrating components of a viral analytics system, according to some example embodiments.

FIG. 2 is a block diagram illustrating components of the viral analytics system 200, according to some example embodiments. As shown in FIG. 2, the viral analytics system 200 includes an accessing module 202, an analysis module 204, a group generating module 206, a presentation module 208, and a tagging module 210, all configured to communicate with each other (e.g., via a bus, shared memory, or a switch).

According to some example embodiments, the accessing module 202 accesses, from a database record that stores digital content, a plurality of items of digital content.

The analysis module 204, for each particular item of digital content the plurality of the items of digital content, extracts a title that describes the particular item of digital content. The extracting of the title is based on analysis of one or more phrases (e.g., the first sentence, one or more keywords, etc.) included in the particular item of digital content.

For example, both of the following tweets generate the title "5 Reasons Why You Should Create a LinkedIn Account."

Tweet Examples:
Tweet 1:
5 Reasons Why You Should Create a LinkedIn Account
http://ow.ly/gZnf30aSFkR #jobseekers #careers
Tweet 2:
5 Reasons Why You Should Create a LinkedIn Account
http://ow.ly/bOGX30aSFkT #job seekers #careers In some example embodiments, the analysis module 204 extracts a topic that describes one or more items of digital content of the plurality of items of digital content based on analysis of the one or more items of digital content using a cube topic technique.

The group generating module 206 generates a group of items of digital content based on the extracted titles associated with the plurality of items of digital content. In some example embodiments, the generating of the group of items of digital content includes generating a thread of items of digital content based on the plurality of items of digital contents. The thread includes a time-based series of the items of digital content.

The analysis module 204 also identifies, from the group of items of digital content, an original item of digital content and one or more subsequent items of digital content. The identifying of the original item of digital content may be based on timestamps associated with the items of digital content included in the group. The one or more subsequent items of digital content are viral mentions of the original item of digital content.

The analysis module 204 also determines a strength value associated with the original item of digital content. In some example embodiments, the determining of the strength value associated with the original item of digital content is based on a number of the one or more subsequent items of digital content included in the group.

The presentation module 208 generates an enhanced user interface on a client device. The generating of the user interface includes causing a display of the title and the strength value associated with the original item of digital content in the user interface of the client device.

The tagging module 210 tags the original digital content item with a first flag in the database record, and tags each of the one or more subsequent items of digital content with a second flag in the database record. In some example embodiments, the generating of the enhanced user interface on the client device, by the presentation module 208, includes identifying, from the database record, one or more items of digital content tagged with the first flag, and modifying the enhanced user interface. The modifying includes causing a display of one or more titles associated with one or more groups of items of digital content, and corresponding strength values associated with one or more original items of digital content included in the one or more groups, including the title that describes the group of items of digital content, and the strength value associated with the original item of digital content in the user interface of the client device.

To perform one or more of its functionalities, the viral analytics system 200 may communicate with one or more other systems. For example, an integration system may integrate the viral analytics system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 212 (e.g., database 128, 130, 132, 136, or 138).

Figure 3:
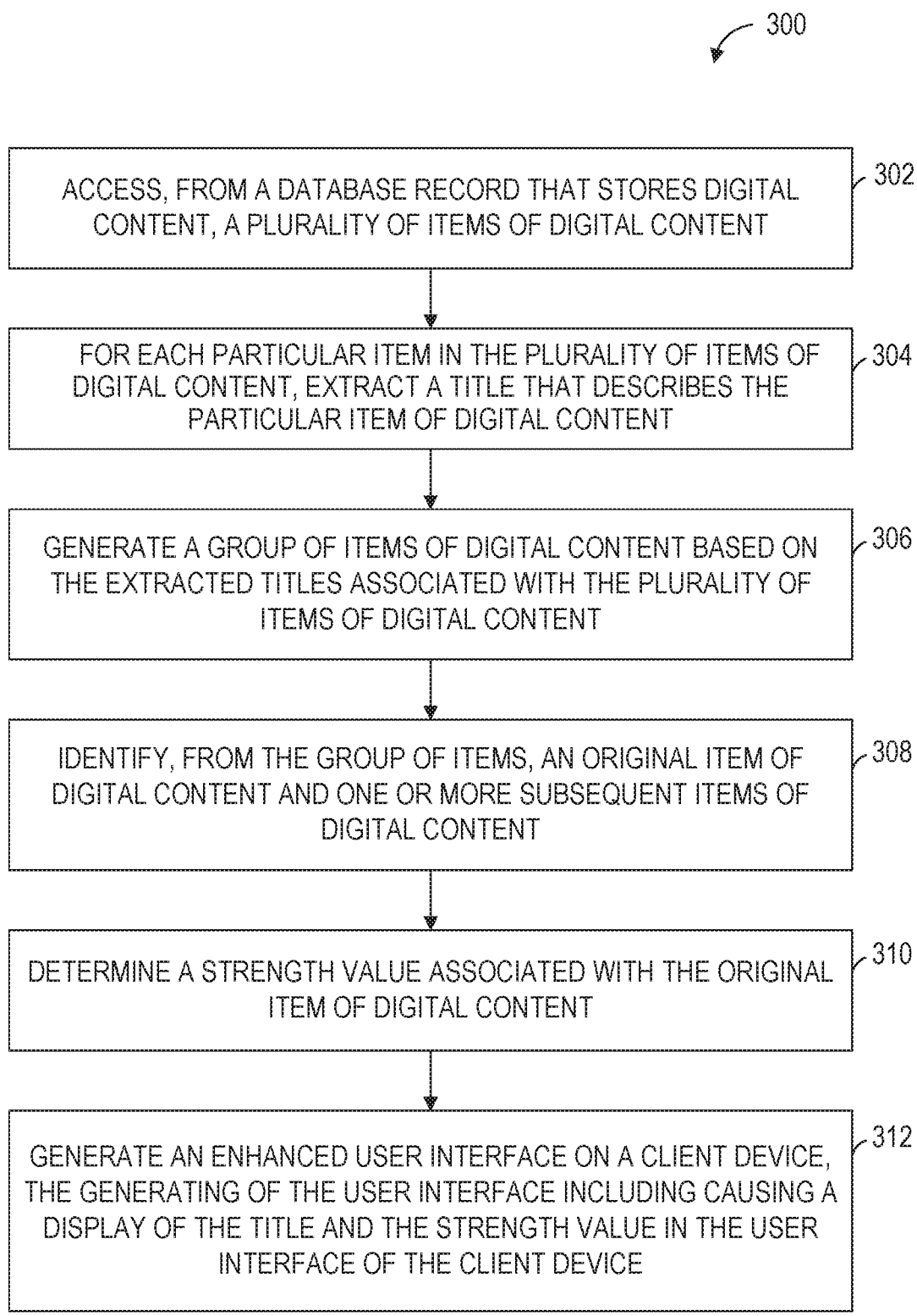
FIG. 3 is a flowchart illustrating a method for generating an enhanced user interface for displaying social analytics based on viral mentions and threading, according to some example embodiments.

FIGS. 3-8 are flowcharts illustrating a method for generating an enhanced user interface for displaying social analytics based on viral mentions and threading, according to some example embodiments. Operations in the method 300 illustrated in FIG. 3 may be performed using modules described above with respect to FIG. 2. As shown in FIG. 3, method 300 may include one or more of method operations 302, 304, 306, 308, 310, and 312, according to some example embodiments.

At operation 302, the accessing module 202 accesses, from a database record that stores digital content, a plurality of items of digital content.

At operation 304, the analysis module 204, for each particular item of digital content in the plurality of the items of digital content, extracts a title that describes the particular item of digital content. The extracting of the title is based on analysis of one or more phrases included in the particular item of digital content. In some example embodiments, a plurality of items of digital content are associated with the same title based on the analysis module 204 determining that plurality of items of digital content have similar content.

At operation 306, the group generating module 206 generates a group of items of digital content based on the extracted titles associated with the plurality of items of digital content.

At operation 308, the analysis module 204 identifies, from the group of items of digital content, an original item of digital content and one or more subsequent items of digital content based on timestamps associated with the items of digital content included in the group. The one or more subsequent items of digital content are viral mentions of the original item of digital content.

At operation 310, the analysis module 204 determines a strength value associated with the original item of digital content. The determining of the strength value associated with the original item of digital content is based on the number of the one or more subsequent items of digital content included in the group. In some instances, a greater number of subsequent items of digital content in a particular group of items of digital content indicates (e.g., represents) a greater strength value associated with the original item of digital content in the particular group of items of digital content.

At operation 312, the presentation module 208 generates an enhanced user interface on a client device. The generating of the user interface includes causing a display of the title and the strength value associated with the original item of digital content in the user interface of the client device.

In some example embodiments, the accessing module 202 receives a query related to the group of items of digital content from the client device. The analysis module 204 performs a search of the items of digital content included in the group based on the query. The performing of the search results in search results. The presentation module 208 modifies the enhanced user interface. The modifying includes causing a display of the search results in the user interface of the client device.

In various example embodiments, the accessing module 202 receives, from the client device, a sort request to sort the one or more titles based on the corresponding strength values associated with the one or more original items of digital content included in the one or more groups. The analysis module 204 sorts the one or more titles based on the corresponding strength values. The sorting of the one or more titles results in a sorted list of titles. The presentation module 208 modifies the enhanced user interface. The modifying includes causing a display of the sorted list of titles and the corresponding strength values associated with the one or more original items of digital content included in the one or more groups.

In certain example embodiments, the analysis module 204 generates, based on the titles associated with the plurality of items of digital content, title identifiers for the plurality of items of digital content. A title identifier (ID) associated with a title may be generated based on applying a hash function (e.g., MD5) to the title, or to a combination of the title and the data from another data field associated with the content. The title identifier is associated with one or more items of digital content that are associated with the same title. For example, the MD5 hash is applied to the concatenation of the name of the data source and the title. The usage of name of data source could be used to facilitate generating a different title ID for contents from different data sources. If the name of data source is removed, then the title ID could be generated for content across different data sources. For example, the tile ID may look like:
{"title_id": "6cfd29d9697b4885c662a246bd5b6d86"}.

The generating of the group of items of digital content based on the titles associated with the plurality of items of digital content includes generating the group of items of digital content based on the title identifiers associated with the plurality of items of digital content. In some instances, the generating of the group of items of digital content is further based on at least one of a source identifier of a source of one or more items of digital content, or a time identifier associated with the one or more items of digital content.

In some example embodiments, the items of digital content are grouped based on a title ID, a source ID, and a date (or a time range). For example, the items of digital content may be aggregated into a group by grouping fields which include the title_id, source_name and date_sk fields. This allows for a smaller granularity grouping of the viral mentions. In certain example embodiments, instead of grouping data within each data source, the grouping could be applied across data sources based on removing the source_fame from the grouping fields.

In some example embodiments, the analysis module 204 determines the sentiment of each digital content item in a group using either a dictionary/rule-based system (e.g. SentiNet) or a machine learned classification system (where text snippets with manually labelled sentiment are used to train a machine learning module and apply the knowledge to a new text snippet to predict the sentiment), and classifies the digital content item as positive, neutral, or negative. The sentiment of a digital content item may be represented (e.g., visually, graphically, textually, etc.) in the user interface in association with a reference to (e.g., an identifier of) the respective digital content item.

Further details with respect to the method operations of the method 300 are described below with respect to FIGS. 4-8.

Figure 4:
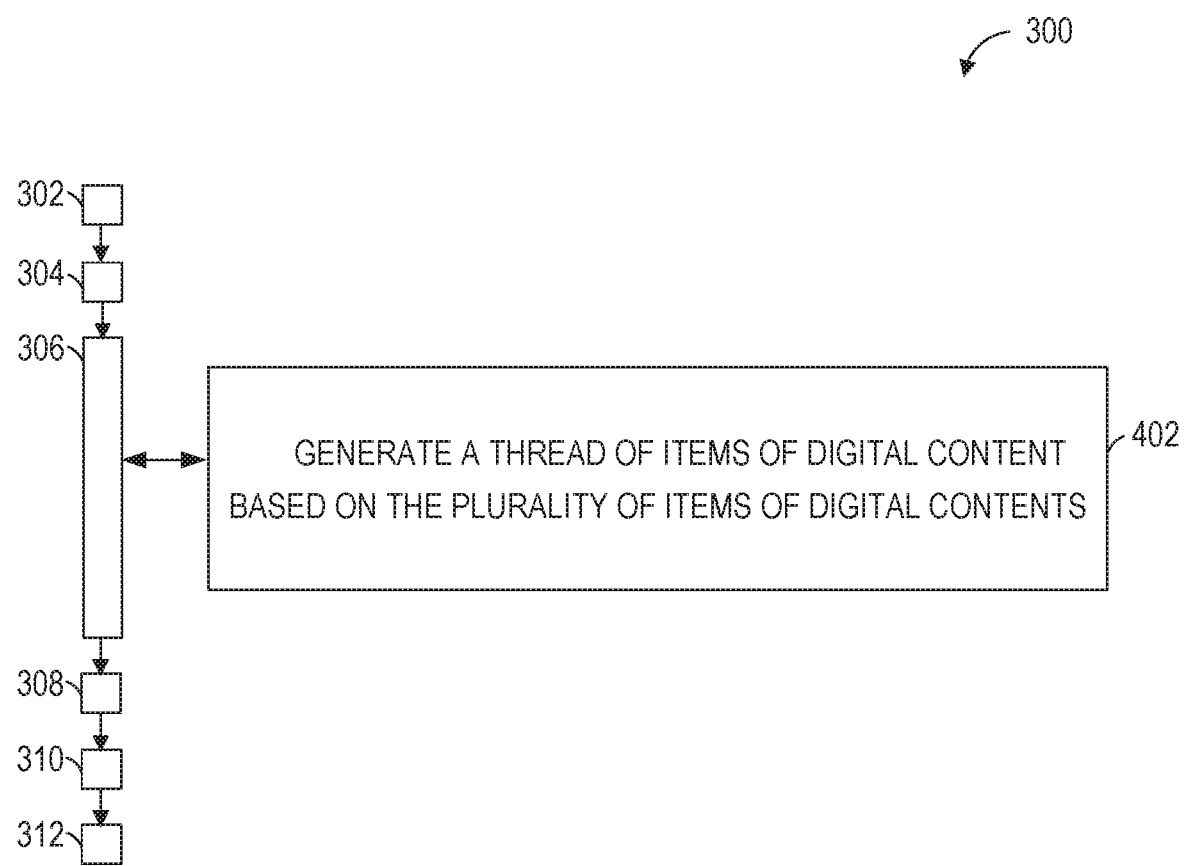
FIG. 4 is a flowchart illustrating a method for generating an enhanced user interface for displaying social analytics based on viral mentions and threading, and representing step 306 of the method illustrated in FIG. 3 in more detail, according to some example embodiments.

As shown in FIG. 4, the method 300 may include operation 402, according to some example embodiments. Operation 402 may be performed as part (e.g., a precursor task, a subroutine, or a portion) of operation 306 of FIG. 3, in which the group generating module 206 generates a group of items of digital content based on the extracted titles associated with the plurality of items of digital content.

At operation 402, the group generating module 206 generates a thread of items of digital content based on the plurality of items of digital contents. The thread includes a time-based series of the items of digital content.

Figure 5:
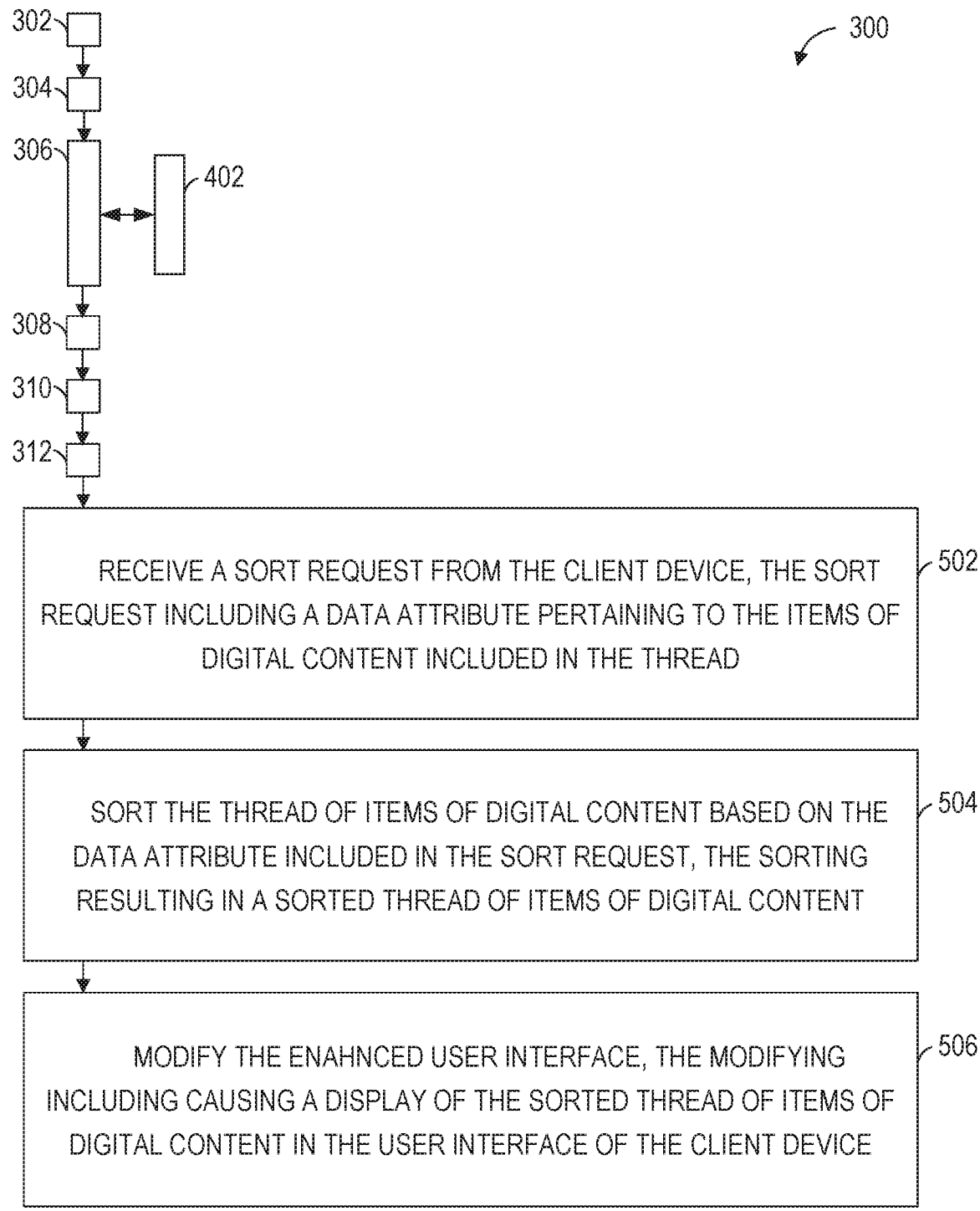
FIG. 5 is a flowchart illustrating a method for generating an enhanced user interface for displaying social analytics based on viral mentions and threading, and representing additional steps of the method illustrated in FIG. 4, according to some example embodiments.

As shown in FIG. 5, the method 300 may include operation 502, 504, or 506, according to some example embodiments. Operation 502 may be performed after operation 312 of FIG. 4, in which the presentation module 208 generates an enhanced user interface on a client device.

At operation 502, the accessing module 202 receives a sort request from the client device. The sort request includes a data attribute pertaining to the items of digital content included in the thread. Example data attributes are a time (e.g., as represented by a timestamp) an item of digital content was created (e.g., posted, published, etc.), an identifier (e.g., a name) of an author of the item of digital content, etc.

At operation 504, the analysis module 204 sorts the thread of items of digital content based on the data attribute included in the sort request. The sorting results in a sorted thread of items of digital content.

In some example embodiments, the data attribute is a time identifier, and the sorting of the thread of items of digital content based on the data attribute includes sorting the thread of items of digital content based on timestamps associated with the items of digital content. The timestamps associated with the items of digital content represent values that the time identifier may take. In various example embodiments, the original item of digital content is listed first in the sorted thread.

In certain example embodiments, the time identifier is a time range, and the sorting of the thread of items of digital content based on the data attribute includes sorting the thread of items of digital content based on timestamps associated with the items of digital content, and the time range.

At operation 506, the presentation module 208 modifies the enhanced user interface. The modifying includes causing a display of the sorted thread of items of digital content in the user interface of the client device.

Figure 6:
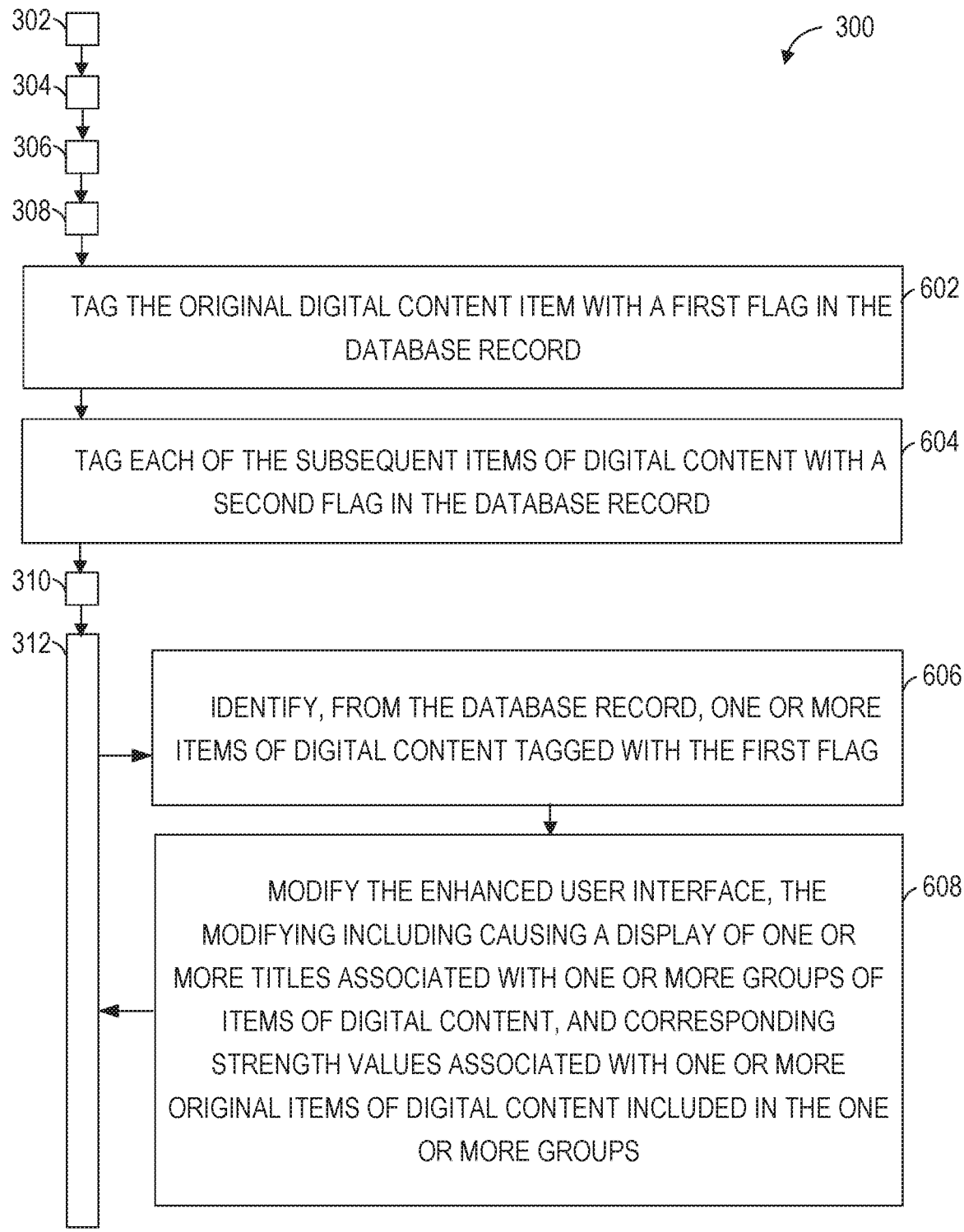
FIG. 6 is a flowchart illustrating a method for generating an enhanced user interface for displaying social analytics based on viral mentions and threading, and representing additional steps of the method illustrated in FIG. 3, and step 312 of the method illustrated in FIG. 3 in more detail, according to some example embodiments.

As shown in FIG. 6, the method 300 may include operation 602, 604, 606, or 608, according to some example embodiments. Operation 602 may be performed after operation 308 of FIG. 3, in which the analysis module 204 identifies, from the group of items of digital content, an original item of digital content and one or more subsequent items of digital content based on timestamps associated with the items of digital content included in the group.

At operation 602, the tagging module 210 tags the original digital content item with a first flag in the database record.

At operation 604, the tagging module 210 tags each of the one or more subsequent items of digital content with a second flag in the database record.

Operation 606 is performed as part (e.g., a precursor task, a subroutine, or a portion) of operation 312, in which the presentation module 208 generates an enhanced user interface on a client device. At operation 606, the presentation module 208 identifies, from the database record, one or more items of digital content tagged with the first flag.

Operation 608 is performed as part (e.g., a precursor task, a subroutine, or a portion) of operation 312, after operation 606. At operation 608, the presentation module 208 modifies the enhanced user interface. The modifying includes causing a display of one or more titles associated with one or more groups of items of digital content, and (e.g., together with) corresponding strength values associated with one or more original items of digital content included in the one or more groups, including the title that describes the group of items of digital content, and the strength value associated with the original item of digital content in the user interface of the client device.

Figure 7:
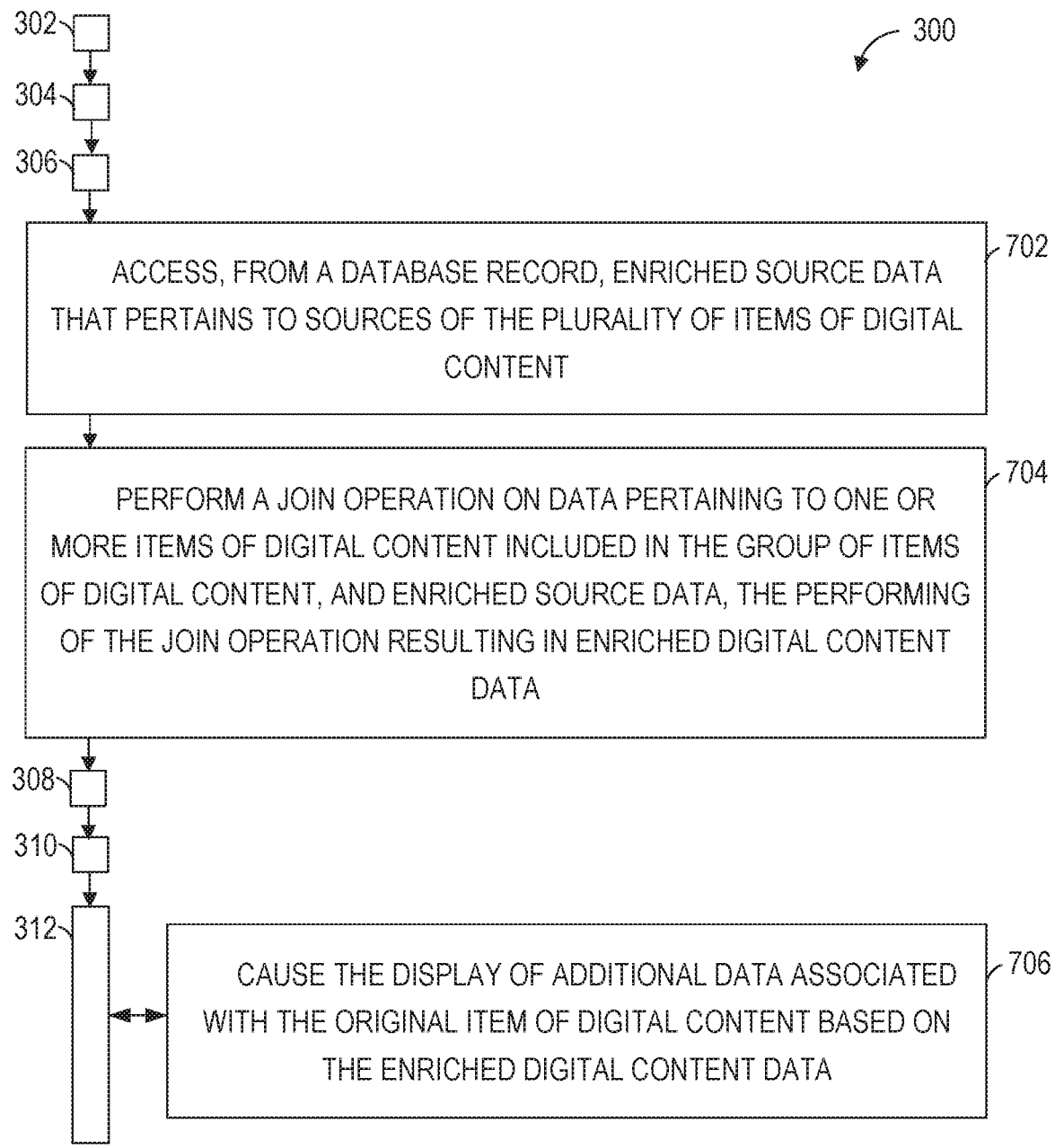
FIG. 7 is a flowchart illustrating a method for generating an enhanced user interface for displaying social analytics based on viral mentions and threading, and representing additional steps of the method illustrated in FIG. 3, and step 312 of the method illustrated in FIG. 3 in more detail, according to some example embodiments.

As shown in FIG. 7, the method 300 may include operations 702, 704, or 706, according to some example embodiments. Operation 702 may be performed after operation 306 of FIG. 3, in which the group generating module 206 generates a group of items of digital content based on the extracted titles associated with the plurality of items of digital content.

At operation 702, the accessing module 202 accesses, from a database record, enriched source data that pertains to sources (e.g., authors, companies or organizations represented by the authors, etc.) of the plurality of items of digital content. In some example embodiments, the enriched digital content data includes at least one of member profile data associated with one or more members of a social networking service, sentiment analysis data associated with one or more items of digital content included in the group, product classification data, followers data, content type data, whitelist data, or blacklist data.

At operation 704, the analysis module 204 performs a join operation on data pertaining to one or more items of digital content included in the group of items of digital content, and enriched source data. The performing of the join operation results in enriched digital content data.

In certain example embodiments, the analysis module 204 performs a left outer join operation between the enriched source data with the data representing the original item of content. During the join operation processing, the analysis module 204, for each item of content in the group, generates a column called viral_flag based on the document_id for the particular item of content. The viral_flag uses the value of "1" to indicate the data records for the original item of content, and a value of "0" to indicate the subsequent (e.g., threaded) items of content within the same group.

In some example embodiments, the enriched source data may be utilized, by the analysis module 204, in further analysis, such as determining which members tend to produce viral mention content, or which regions produce viral mention content. The viral analytics system 200 may generate and cause the display, in a user interface of a client device, of a digital viral map that indicates where the certain regions active in generating viral mentions are, or where different regions are associated with the most popular topic(s) in that region. The digital viral map may be interactive when displayed in a user interface of a client device of a user. The viral analytics system 200 may allow the user to select (e.g., click on) an identifier of an original content item via the interactive digital viral map, and, based on the selection received from a client device of the user, may cause a display of data about the content creator (e.g., how many viral mentions this creator generated before, how many of his content items went viral, etc.).

Operation 706 is performed as part (e.g., a precursor task, a subroutine, or a portion) of operation 312, in which the presentation module 208 generates an enhanced user interface on a client device. At operation 706, the presentation module 208 causes the display of additional data associated with the original item of digital content based on the enriched digital content data.

Figure 8A:
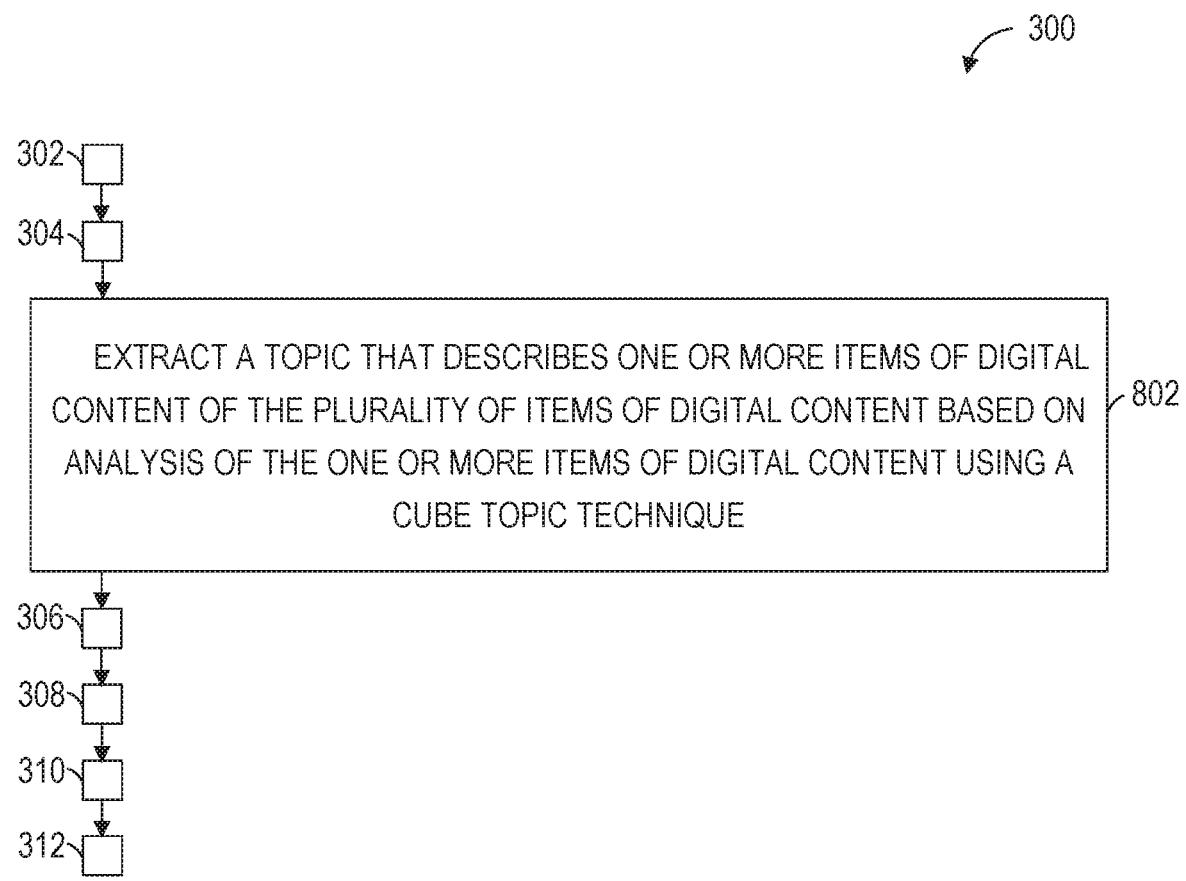
FIG. 8A is a flowchart illustrating a method for generating an enhanced user interface for displaying social analytics based on viral mentions and threading, and representing an additional step of the method illustrated in FIG. 3, according to some example embodiments.

As shown in FIG. 8A, the method 300 may include operation 802, according to some example embodiments. Operation 802 may be performed after operation 304 of FIG. 3, in which the analysis module 204, for each particular item of digital content in the plurality of the items of digital content, extracts a title that describes the particular item of digital content.

At operation 802, the analysis module 204 extracts a topic that describes one or more items of digital content of the plurality of items of digital content based on analysis of the one or more items of digital content using a cube topic technique.

Step 1. Topic Extraction

In some example embodiments, topics are extracted from the content of social media and internal text content using regular expression matching based on POS tag, using unsupervised clustering algorithms, such as the WA algorithm, or with a tool such as the Stanford Topic Modeling Toolbox. The ordered topic set (OTS) may be defined as the ordered set for the topics of the content and the order could be customized based on certain mechanism such as the alphabet order of topics or the relevance score of topics. The topic field is a bag of topics. For example, the following two document could generate the following topics:

d1=> (doc_id: d1; topic: {t1, t2, t3}), and
d2 => (doc_id: d2; topic: [t1, t3, t5}).

Step 2. Cube Topic Generating

For an ordered topic set, a cube topic set (CBS) is a power set for the ordered topic set. For example, if the ordered topic set is {t1,t2,t3}, the cube topic set is {{ }, {t1}, {t2,}, {t3}, {t1,t2}, {t1,t3}, {t2,t3}, {t1,t2,t3}}.

A set in the ordered topic set is called a cube topic, such as {t1, t2}. A lower bound and an upper bound are defined for the length of a cube topic when emitting a cube topic from a cube topic set for the viral mention topic. This is because there are too many mentions for one small cube topic, and too few mentions for a very large cube topic. Also, other filter conditions, such as a relevance score, could be applied to filter the cube topic.

For example, if the lower limit is defined as "2" and the upper limit is defined as "3," then (doc_id: d1; topic: {t1, t2, t3}) => (doc_id: d1; cube_topic: {(t1, t2), (t1, t3), (t2, t3), (t1, t2, t3)}), and (doc_id: d2; topic: {t1, t3, t5}) => (doc_id: d2; cube_topic: {(t1, t3), (t1, t5), (t3, t5), (t1, t3, t5)}).

Figure 8B:
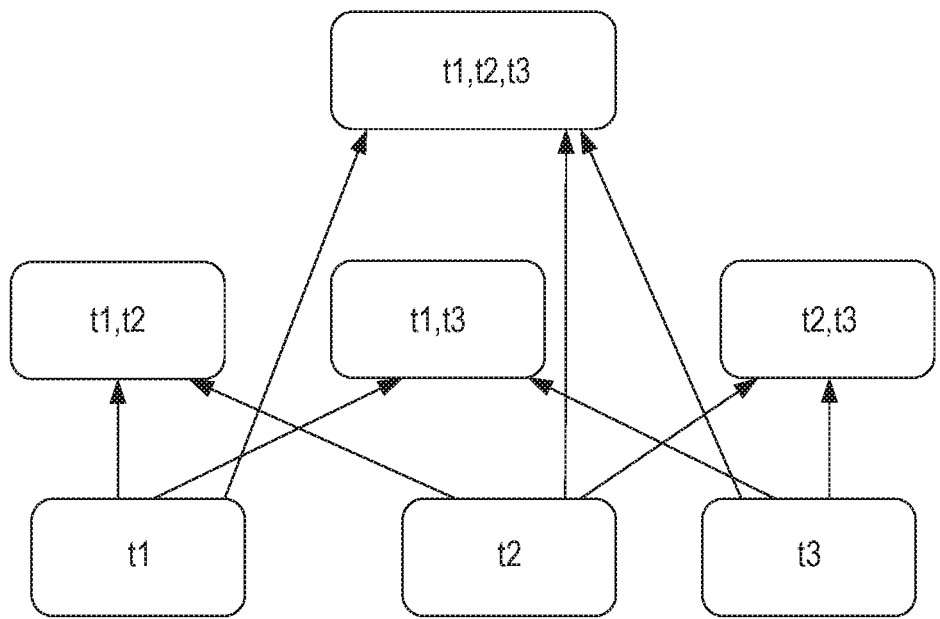
FIG. 8B is a diagram illustrating a graph which shows a cube topic in layered structure, according to some example embodiments.

FIG. 8B is a diagram illustrating a graph which shows the cube topic in layered structure, according to some example embodiments.

Step 3. Expanding Records Based on Cube Topic

For each record, the system expands the record into multiple records for each cube topic. For example, for the records in the above example, the system generates the following data.

```
(doc_id: d1; cube_topic: {t1, t2}, {t1, t3}, {t2, t3}, {t1, t2, t3}) =>
(doc_id: d1; cube_topic: {t1, t2}),
(doc_id: d1; cube_topic: {t1, t3}),
(doc_id: d1; cube_topic: {t2, t3}),
(doc_id: d1; cube_topic: {t1, t2, t3}),
(doc_id: d2; cube_topic: {{t1, t3}, {t1, t5}, {t3, t5}, {t1, t3, t5}}) =>
(doc_id: d2; cube_topic: {t1, t3}),
(doc_id: d2; cube_topic: {t1, t5}),
(doc_id: d2; cube_topic: {t3, t5}),
(doc_id: d2; cube_topic: {t1, t3, t5}).
```

Further steps could continue to use step 2 (e.g., generating the cube topic) for further id generation and grouping.

Step 4. Optimization for Compressing Cube Topic with Map

In some instances, there are too many cube topics for a document. A further optimization scheme may be implemented by the system for saving storage space and improving performance of the system.

For step 2, the system generates a map-to-map field in order to map the topic to the document. The key in the key-value pair of the map is the ordered set of topics, and the value in the key-value pair is the ordered set of documents. For example:

```
(doc_id: d1; topic: t1, t2, t3) => (doc_id: d1; topic_map:
[<(t1, t2, t3)#(d1)>]), and
(doc_id: d2; topic: {t1, t3, t5}) => (doc_id: d2; topic_map:
[<(t1, t3, t5)#d2>]).
```

Step 5. Aggregating and Merging Topic Map

The system applies aggregation based on the field topic map to generate the viral mention topics. The algorithm generates the intersected cube topic with the union of corresponding documents from the two maps and then merges it into the final map. For performance optimization, the small map could be broadcasted for the merging. The algorithm of map aggregation and merging listed below is using java language style:

```
public Map < Set < String > , Set < String >> mergeMapTopic(Map < Set < String
> , Set < String >> map1, Map < Set < String > , Set < String >> map2) {
    Map < Set < String > , Set < String >> result = new HashMap < Set < String > ,
Set < String >> ( );
    for (Map.Entry < Set < String > , Set < String >> entry1: map1.entrySet( )) {
        for (Map.Entry < Set < String > , Set < String >> entry2: map2.entrySet( )) {
            //get intersected cube topic from entry in map1 and entry in map2
            Set < String > inertsectedCubeTopic = setIntersect(entry1.getKey( ),
entry2.getKey( ));
            if (inertsectedCubeTopic.size( ) > 0) {
                //get union of corresponding documents
                Set < String > unionDocument = setUnion(entry1.getValue( ), entry2.getValue( ));
                //merge the intersected cube topic into the final result
                mergeTopic(inertsectedCubeTopic, unionDocument, result);
            }
        //merge entry(cube topic) from map1 into the final result
        mergeTopic(entry1.getKey( ), entry1.getValue( ), result);
        //merge entry(cube topic) from map2 into the final result
        mergeTopic(entry2.getKey( ), entry2.getValue( ), result);
        }
    }
    return result;
}
public Set < String > setUnion(Set < String > a, Set < String > b) {
Set < String > s = new HashSet < String > ( );
s.addAll(a);
s.addAll(b);
return s;
}
public Set < String > setIntersect(Set < String > a, Set < String > b) {
Set < String > s = new HashSet < String > ( );
s.addAll(a);
s.retainAll(b);
return s;
}
public void mergeTopic(Set < String > topic, Set < String > document, Map < Set <
String > , Set < String >> result) {
if (!result.containsKey(topic)) {
  result.put(topic, document);
  } else {
  result.put(topic, union(document, result.get(topic)));
  }
}
For example, here is the data example:
(doc_id: d1; topic_map: [<(t1, t2, t3)#(d1)>])
+
(doc_id: d2; topic_map: [<(t1, t3, t5)#(d2)>])
=>
(topic_merge: [<(t1, t2, t3)#(d1)>, <(t1, t3, t5)>#(d2)>, <(t1, t3)>#(d1, d2)>])
```

Step 6. Merging Optimization with Augmented Interval Tree

In order to reduce the number of set intersection for cube topic, the augmented interval tree could be further adopted. The cube topic generates an interval with the minimal topic and the maximum topic based on certain order of the topic such as an alphabetic order. For example, a cube topic (t1, t3, t5) generates an interval [t1,t5], and (t7, t8, t10) will generate an interval [t7, t10]. The interval tree of the topic is a binary search tree which is built based on the order of minimum topic value from the topic interval. The node of the interval tree also includes an extra annotation of the maximum topic value of the topic intervals for the subtree of the node besides the interval of minimal topic and maximum topic. With the interval tree, since the [t1, t5] does not join with [t7, t10], it reduces the overhead of trying to join cube topic (t1,t3,t5) with cube topic (t7, t8, t10) without going through some branches in the interval tree.

In some example embodiments, the functionalities of the viral analytics system could be applied not only to social media data, but also to internal data of an organization (e.g., feedback and comments). The functionalities of the viral analytics system could also be applied to security networks. The viral analytics system can formulate a software or a virus or a malware or an phone application to be a system call or permission behavior based content, where the system call or permission behavior is analogous to the topic. The viral analytics system can be used to detect viruses or malware in mobile (e.g., Android) applications (also "apps"). Viruses or malware usually make system calls (at low system level) that generate permission behaviors which are analogous to the topic spreading behavior. Such permission behaviors can be analyzed by the viral analytics system. For example, some sequence of system call of application or permission behavior of an android application is analogous to a cube topic. The viral mention analysis may be used to perform behavior analysis for malware in order to figure out the frequently used common patterns of malware which could be further used as a signature for malware detection with fast signature matching.

In various example embodiments, the viral analytics system collects comments, likes of the content, and identifiers of followers of the authors in order to be utilized as a weight factor for a viral mention score. The formula of a viral score of the content is listed below:

$$ViralScore_i = \alpha_{i1} \times MentionScore_i + \alpha_{i2} \times InflunceScore_i$$

where $\alpha_{i1}$ and $\alpha_{i2}$ are the percentage score hick could be adjusted based on different focus to either MentionScore or a InflunceScore The formula for $MentionScore_i$ is:

$$MentionScore_i = \frac{\sum_{j=1}^{M} CubeTopic_j \times \beta_j}{M}$$

where the $CubeTopic_i$ is the score for the cube topic that is mentioned in the content. It is the number of documents that contains the cube topic. The $\beta_j$ is the similarity score between the cube topic and the predefined whitelist keywords. The formula for $InfluenceScore_i$:

$$InfluenceScore_i = \frac{\sum_{j=1}^{N} \gamma_j \times InfluenceFactor_j}{N}$$

where the $InfluenceFactor_j$ is any component that is contributed to the impact of influencing the viral mention, such as number of comments, number of favorites, number of likes, or the number followers of the post author, etc. The $\gamma_j$ is the percentage score for each influence factor.

In certain example embodiments, based on existing viral mention data and the ViralScore for each item of digital content, the viral analytics system can build machine learning models to predict the probability of viral mentions of a future content.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
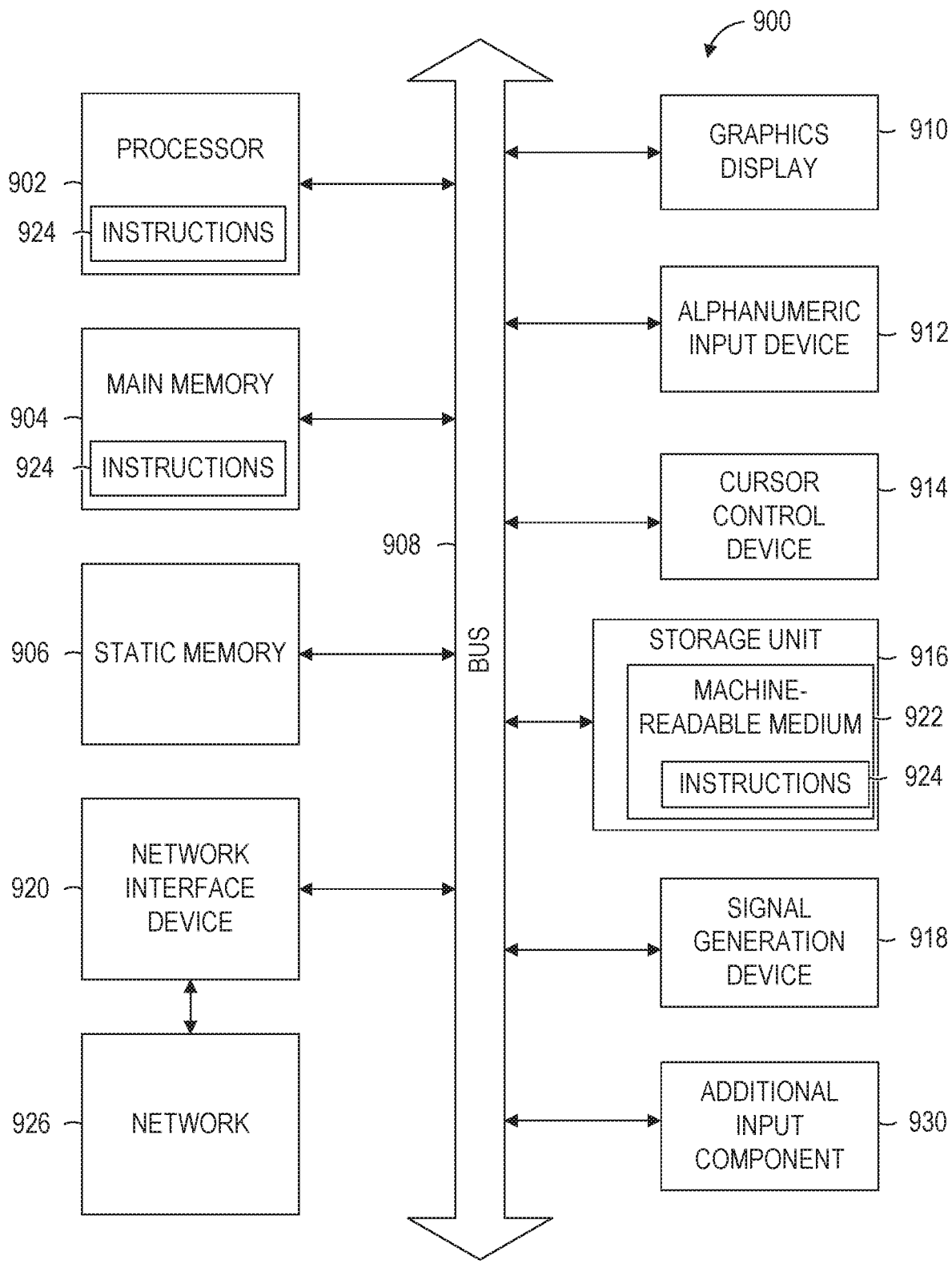
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 926 via the network interface device 920. For example, the network interface device 920 may communicate the instructions 924 using any one or more transfer protocols (e.g., hypertext transfer protocol (HTTP)).

In some example embodiments, the machine 900 may be a portable computing device, such as a smart phone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:

accessing, from a database record that stores digital content, a plurality of items of digital content;

for each particular item of digital content in the plurality of the items of digital content, extracting, using one or more hardware processors, a title that describes the particular item of digital content, the extracting of the title being based on analysis of one or more phrases included in the particular item of digital content;

generating a group of items of digital content based on the extracted titles associated with the plurality of items of digital content;

identifying, from the group of items of digital content, an original item of digital content and one or more subsequent items of digital content based on timestamps associated with the items of digital content included in the group;

labelling all items in the group of items of digital content having timestamps later than a timestamp of the original item as subsequent items;

calculating a strength value score for the original item of digital content, wherein the strength value score is equal to a number of the one or more subsequent items of digital content included in the group; and generating an enhanced user interface on a client device, the generating of the user interface including causing a display of the title of the original item of digital content and the strength value score associated with the original item of digital content in the user interface of the client device.

2. The method of claim 1, wherein the generating of the group of items of digital content includes:

generating a thread of items of digital content based on the plurality of items of digital contents, the thread including a time-based series of the items of digital content.

3. The method of claim 2, further comprising:

receiving a sort request from the client device, the sort request including a data attribute pertaining to the items of digital content included in the thread;

sorting the thread of items of digital content based on the data attribute included in the sort request, the sorting resulting in a sorted thread of items of digital content; and modifying the enhanced user interface, the modifying including causing a display of the sorted thread of items of digital content in the user interface of the client device.

4. The method of claim 3, wherein the data attribute is a time identifier, and wherein the sorting of the thread of items of digital content based on the data attribute includes sorting the thread of items of digital content based on timestamps associated with the items of digital content.

5. The method of claim 4, wherein the original item of digital content is listed first in the sorted thread.

6. The method of claim 4, wherein the time identifier is a time range, and
wherein the sorting of the thread of items of digital content based on the data attribute includes sorting the thread of items of digital content based on timestamps associated with the items of digital content, and the time range.

7. The method of claim 1, further comprising:
receiving a query related to the group of items of digital content from the client device;
performing a search of the items of digital content included in the group based on the query, the performing of the search resulting in search results; and
modifying the enhanced user interface, the modifying including causing a display of the search results in the user interface of the client device.

8. The method of claim 1, wherein the one or more subsequent items of digital content are viral mentions of the original item of digital content.

9. The method of claim 1, further comprising:
tagging the original digital content item with a first flag in the database record; and
tagging each of the one or more subsequent items of digital content with a second flag in the database record,
wherein the generating of the enhanced user interface on the client device includes:
identifying, from the database record, one or more items of digital content tagged with the first flag; and
modifying the enhanced user interface, the modifying including causing a display of one or more titles associated with one or more groups of items of digital content, and corresponding strength value scores for one or more original items of digital content included in the one or more groups, including the title that describes the group of items of digital content, and the strength value score for with the original item of digital content in the user interface of the client device.

10. The method of claim 1, further comprising:
receiving, from the client device, a sort request to sort the one or more titles based on the corresponding strength value scores for the one or more original items of digital content included in the one or more groups;
sorting the one or more titles based on the corresponding strength value scores, the sorting of the one or more titles resulting in a sorted list of titles; and
modifying the enhanced user interface, the modifying including causing a display of the sorted list of titles and the corresponding strength value scores for the one or more original items of digital content included in the one or more groups.

11. The method of claim 1, further comprising:
generating, based on the titles associated with the plurality of items of digital content, title identifiers for the plurality of items of digital content,
wherein the generating of the group of items of digital content based on the titles associated with the plurality of items of digital content includes:
generating the group of items of digital content based on the title identifiers for the plurality of items of digital content.

12. The method of claim 11, wherein the generating of the group of items of digital content is further based on at least one of a source identifier of a source of one or more items of digital content, or a time identifier associated with the one or more items of digital content.

13. The method of claim 1, further comprising:
accessing, from a database record, enriched source data that pertains to sources of the plurality of items of digital content; and
performing a join operation on data pertaining to one or more items of digital content included in the group of items of digital content, and enriched source data, the performing of the join operation resulting in enriched digital content data,
wherein the generating of the enhanced user interface includes causing the display of additional data associated with the original item of digital content based on the enriched digital content data.

14. The method of claim 13, wherein the enriched digital content data includes at least one of member profile data associated with one or more members of a social networking service, sentiment analysis data associated with one or more items of digital content included in the group, product classification data, followers data, content type data, whitelist data, or blacklist data.

15. The method of claim 1, further comprising:
extracting a topic that describes one or more items of digital content of the plurality of items of digital content based on analysis of the one or more items of digital content using a cube topic technique.

16. A system comprising:
one or more hardware processors; and
a machine-readable medium for storing instructions that, when executed by the one or more hardware processors, cause the one or more hardware processors to perform operations comprising:
accessing, from a database record that stores digital content, a plurality of items of digital content;
for each particular item of digital content in the plurality of the items of digital content, extracting, using one or more hardware processors, a title that describes the particular item of digital content, the extracting of the title being based on analysis of one or more phrases included in the particular item of digital content;
generating a group of items of digital content based on the extracted titles associated with the plurality of items of digital content;
identifying, from the group of items of digital content, an original item of digital content and one or more subsequent items of digital content based on timestamps associated with the items of digital content included in the group;
labelling all items in the group of items of digital content having timestamps later than a timestamp of the original item as subsequent items;
calculating a strength value score for the original item of digital content, wherein the strength value score is equal to a number of the one or more subsequent items of digital content included in the group; and
generating an enhanced user interface on a client device, the generating of the user interface including causing a display of the title of the original item of digital content and the strength value score associated with the original item of digital content in the user interface of the client device.

17. The system of claim 16, wherein the operations further comprise:
tagging the original digital content item with a first flag in the database record; and
tagging each of the one or more subsequent items of digital content with a second flag in the database record, wherein the generating of the enhanced user interface on the client device includes:
identifying, from the database record, one or more items of digital content tagged with the first flag; and
modifying the enhanced user interface, the modifying including causing a display of one or more titles associated with one or more groups of items of digital content, and corresponding strength value scores for one or more original items of digital content included in the one or more groups, including the title that describes the group of items of digital content, and the strength value score for the original item of digital content in the user interface of the client device.

18. The system of claim 16, wherein the operations further comprise:
generating, based on the titles associated with the plurality of items of digital content, title identifiers for the plurality of items of digital content,
wherein the generating of the group of items of digital content based on the titles associated with the plurality of items of digital content includes:
generating the group of items of digital content based on the title identifiers for the plurality of items of digital content.

19. A non-transitory machine-readable storage medium comprising instructions that, when executed by one or more hardware processors of a machine, cause the one or more hardware processors to perform operations comprising:
accessing, from a database record that stores digital content, a plurality of items of digital content;
for each particular item of digital content in the plurality of the items of digital content, extracting, using one or more hardware processors, a title that describes the particular item of digital content, the extracting of the title being based on analysis of one or more phrases included in the particular item of digital content;
generating a group of items of digital content based on the extracted titles associated with the plurality of items of digital content;
identifying, from the group of items of digital content, an original item of digital content and one or more subsequent items of digital content based on timestamps associated with the items of digital content included in the group;
labelling all items in the group of items of digital content having timestamps later than a timestamp of the original item as subsequent items;
calculating a strength value score for the original item of digital content, wherein the strength value score is equal to a number of the one or more subsequent items of digital content included in the group; and
generating an enhanced user interface on a client device, the generating of the user interface including causing a display of the title of the original item of digital content and the strength value score associated with the original item of digital content in the user interface of the client device.

* * * * *